(12) United States Patent
Hayton

(10) Patent No.: US 8,657,563 B2
(45) Date of Patent: Feb. 25, 2014

(54) SEALING ASSEMBLY

(75) Inventor: Paul R. Hayton, Bristol (GB)

(73) Assignee: Rolls-Royce PLC, London (GB)

( * ) Notice: Subject to any disclaimer, the term of this patent is extended or adjusted under 35 U.S.C. 154(b) by 500 days.

(21) Appl. No.: 13/085,036

(22) Filed: Apr. 12, 2011

(65) Prior Publication Data

US 2011/0274534 A1    Nov. 10, 2011

(30) Foreign Application Priority Data

May 7, 2010   (GB) .................................... 1007601

(51) Int. Cl.
*F01D 25/26* (2006.01)
(52) U.S. Cl.
USPC ............................ 415/108; 415/135; 415/220
(58) Field of Classification Search
USPC ............................ 415/108, 135; 277/631, 637
See application file for complete search history.

(56) References Cited

U.S. PATENT DOCUMENTS

| | | | |
|---|---|---|---|
| 2,571,817 A * | 10/1951 | Armstrong ....................... | 48/176 |
| 4,171,093 A | 10/1979 | Honeycutt, Jr. et al. | |
| 4,326,835 A | 4/1982 | Wertz | |
| 4,813,608 A | 3/1989 | Holowach et al. | |
| 5,470,198 A * | 11/1995 | Harrogate et al. ............ | 415/115 |
| 5,524,846 A * | 6/1996 | Shine et al. ................. | 244/53 R |
| 6,883,806 B2 * | 4/2005 | Guzzardo ...................... | 277/628 |
| 7,367,567 B2 * | 5/2008 | Farah et al. .................... | 277/650 |
| 2003/0046940 A1 | 3/2003 | Matsuda et al. | |
| 2010/0007093 A1 | 1/2010 | Grondahl | |

FOREIGN PATENT DOCUMENTS

| | | |
|---|---|---|
| EP | 0 943 847 A3 | 9/1999 |
| EP | 1 391 582 A2 | 2/2004 |
| EP | 1 705 343 A3 | 9/2006 |
| GB | 2 153 030 A | 8/1985 |
| WO | WO 2010/043778 A1 | 4/2010 |

OTHER PUBLICATIONS

European Search Report dated Aug. 5, 2011 issued in European Patent Application No. 11 16 2048.
British Search Report dated Aug. 16, 2010 issued in British Patent Application No. 1007601.6.

* cited by examiner

*Primary Examiner* — Ninh H Nguyen
(74) *Attorney, Agent, or Firm* — Oliff PLC

(57) ABSTRACT

A sealing assembly is provided for sealing against a component. The sealing assembly comprises a seal carrier and a continuous seal element that is attached to the seal carrier at at least two discrete positions of attachment. The seal element is provided with a sealing surface that is arranged to seal against the component. The seal element is further provided with a thermal expansion slot that is located between the discrete positions of attachment and which extends from a first edge of the seal element over a portion of the width of the seal element. This allows the seal carrier and seal element to thermally expand in the length direction at different rates.

15 Claims, 7 Drawing Sheets

(A)

(B)

SEALING ASSEMBLY

Figure 1A:
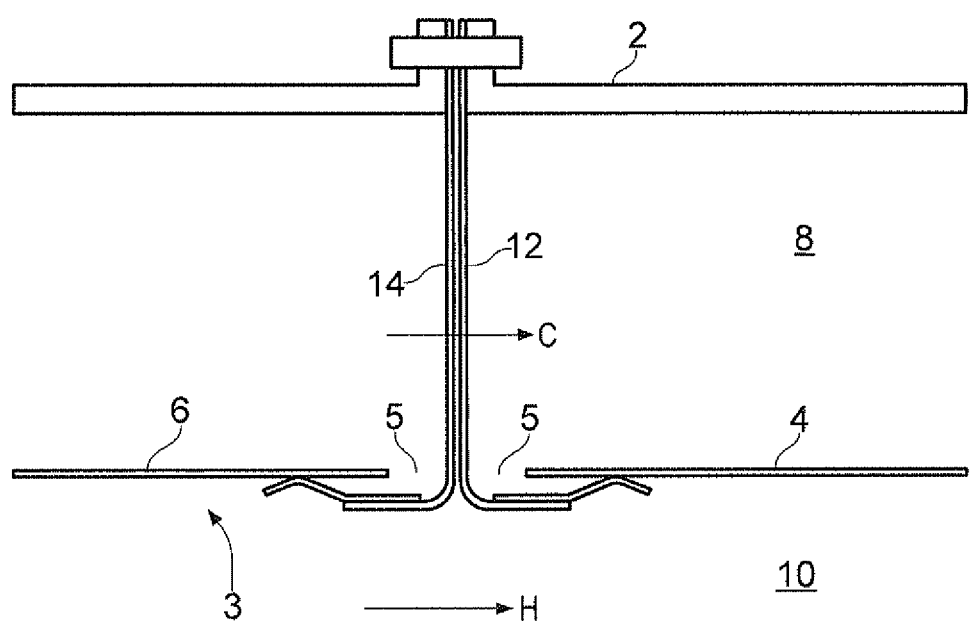

The invention relates to a sealing assembly, and particularly, although not exclusively, to a sealing assembly for providing a seal against a liner panel in the exhaust system of a gas turbine engine.

The exhaust system of a gas turbine engine includes a substantially annular casing having an annular arrangement of liner panels disposed therein. The arrangement of liner panels comprises a plurality of rings (or annuluses) of liner panels located axially next to one another with a gap between adjacent rings. Alternatively an exhaust system of a gas turbine engine may include a non circular casing (for example of elliptical cross section or polygonal cross section) having an arrangement of liner panels disposed therein which define a non circular gas flow path (for example of elliptical cross section or polygonal cross section respectively).

A cooling air duct is defined between the casing and the arrangement of liner panels and an exhaust gas duct is defined radially within the arrangement of liner panels. In use, cooling air flows within the cooling air duct and hot exhaust gases flow within the exhaust gas duct.

It is necessary to provide a sealing assembly that seals between adjacent rings of liner panels in order to prevent the mixing between the cooling air flow and the hot exhaust gas flow. Due to the thermal gradient across the sealing assembly it is necessary for it to be able to withstand differential thermal expansion between parts of the sealing assembly, whilst still providing a satisfactory seal. Existing sealing assemblies that achieve this objective comprise a relatively large number of discrete parts and are therefore expensive and time consuming to manufacture and install.

It is therefore desirable to provide a sealing assembly that can withstand differential thermal expansion between components whilst still providing a satisfactory seal.

The present invention is defined in the attached independent claim to which reference should now be made. Further, preferred features may be found in the sub-claims appended thereto.

According to an aspect of the invention there is provided a sealing assembly for providing a seal against a component, comprising: a seal carrier; and a continuous seal element attached to the seal carrier at at least two discrete positions of attachment, the seal element having a sealing surface that is arranged to seal against the component; wherein the seal element is provided with a first thermal expansion slot that is located between the discrete positions of attachment and which extends from a first edge of the seal element over a portion of the width of the seal element so as to allow the seal carrier and seal element to thermally expand in the length direction at different rates. The seal element may be provided with a first thermal expansion slot between each pair of adjacent discrete positions of attachment. The sealing assembly may be arranged to seal between a hotter region and a cooler region and therefore there may be a thermal gradient across the sealing assembly.

The seal element may be further provided with a second thermal expansion slot which is located adjacent to the or each first thermal expansion slot and which extends from a second edge of the seal element over a portion of the width of the seal element. The first and second thermal expansion slots may be spaced from one another (in the length direction) and overlap in the width direction of the seal element.

The first and/or second thermal expansion slots may extend in substantially the width direction of the seal element.

The end of the first and/or second thermal expansion slot located away from the edge of the seal element may have an enlarged width (when compared to the width of the rest of the thermal expansion slot).

The seal element may comprise a seal element flange and the seal carrier may comprise a seal carrier flange to which the seal element flange is attached such that they overlap.

The seal carrier may be provided with a seal carrier thermal expansion slot that is located between the discrete positions of attachment. The seal carrier thermal expansion slot may be provided in the seal carrier flange. The seal carrier thermal expansion slot may extend in substantially the width direction of the seal carrier.

The seal element may be attached to the seal carrier by rivets.

According to a further aspect of the invention there is provided a gas turbine engine comprising: a casing; a liner panel disposed within the casing, wherein a cold flow region is defined between the casing and the liner panel and a hot flow region is defined inside the liner panel; and a sealing assembly in accordance with any statement herein, wherein the seal carrier is attached to the casing and extends across the cold flow region, and wherein the sealing surface of the seal element seals against the liner panel.

According to yet a further aspect of the invention there is provided a sealing assembly for providing a seal between first and second components, comprising: a first sealing assembly comprising a sealing assembly in accordance with any statement herein, wherein the sealing surface of the seal element is arranged to seal against the first component; and a second sealing assembly comprising a sealing assembly in accordance with any statement herein, wherein the sealing surface of the seal element is arranged to seal against the second component. The seal carriers of the first and second sealing assemblies may be coupled to one another such that the seal elements of the first and second sealing assemblies extend in opposing directions. The seal carriers of the first and second sealing assemblies may be integrally formed or attached to one another. The seal carrier of the first and second sealing assemblies may be the same component.

According to another aspect of the invention there is provided a gas turbine engine comprising: a casing; first and second liner panels disposed within the casing and spaced from one another, wherein a cold flow region is defined between the casing and the liner panels and a hot flow region is defined inside the liner panels; and a sealing assembly in accordance with the preceding statement, wherein the seal carriers of the first and second sealing assemblies are attached to the casing and extend across the cold flow region, and wherein the sealing surface of the first sealing assembly seals against the first liner panel and the sealing surface of the second sealing assembly seals against the second liner panel, thereby restricting the flow between the cold flow region and the hot flow region.

The invention also concerns a gas turbine engine comprising a sealing assembly in accordance with any statement herein.

The invention may comprise any combination of the features and/or limitations referred to herein, except combinations of such features as are mutually exclusive.

Figure 1B:
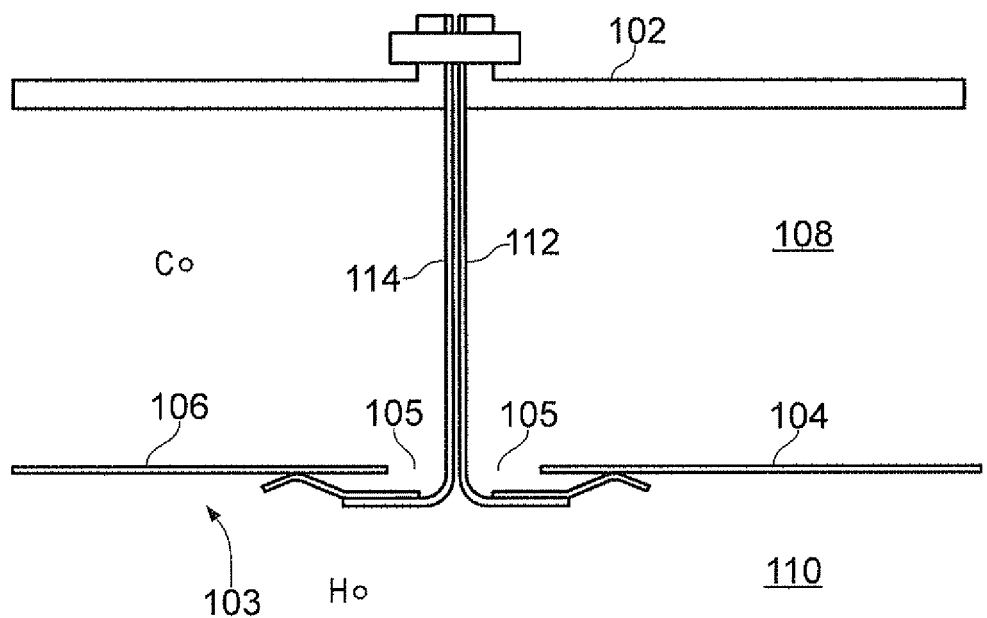
Figure 2A:
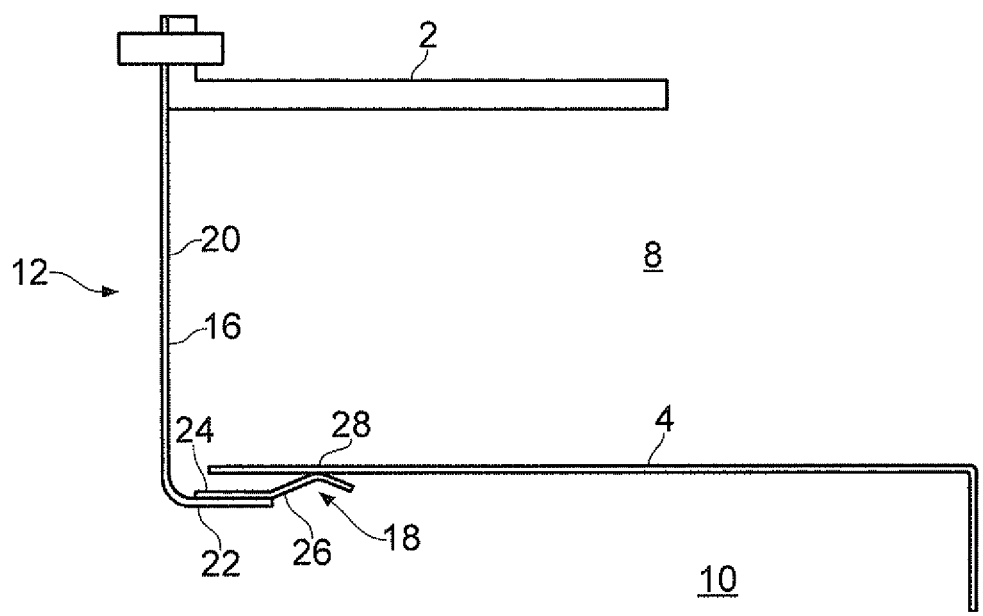
Figure 2B:
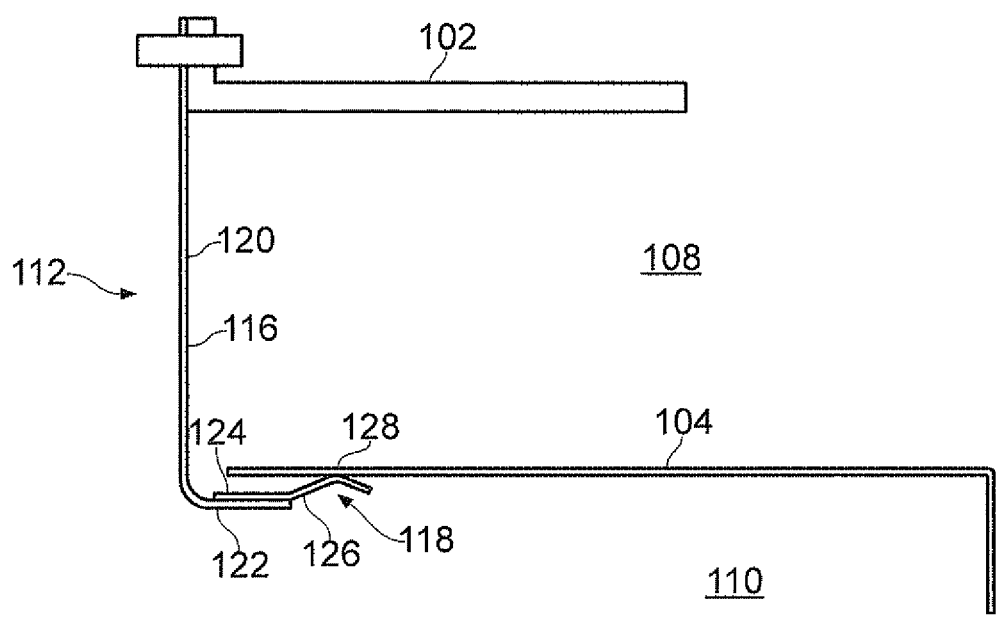
Figure 3A:
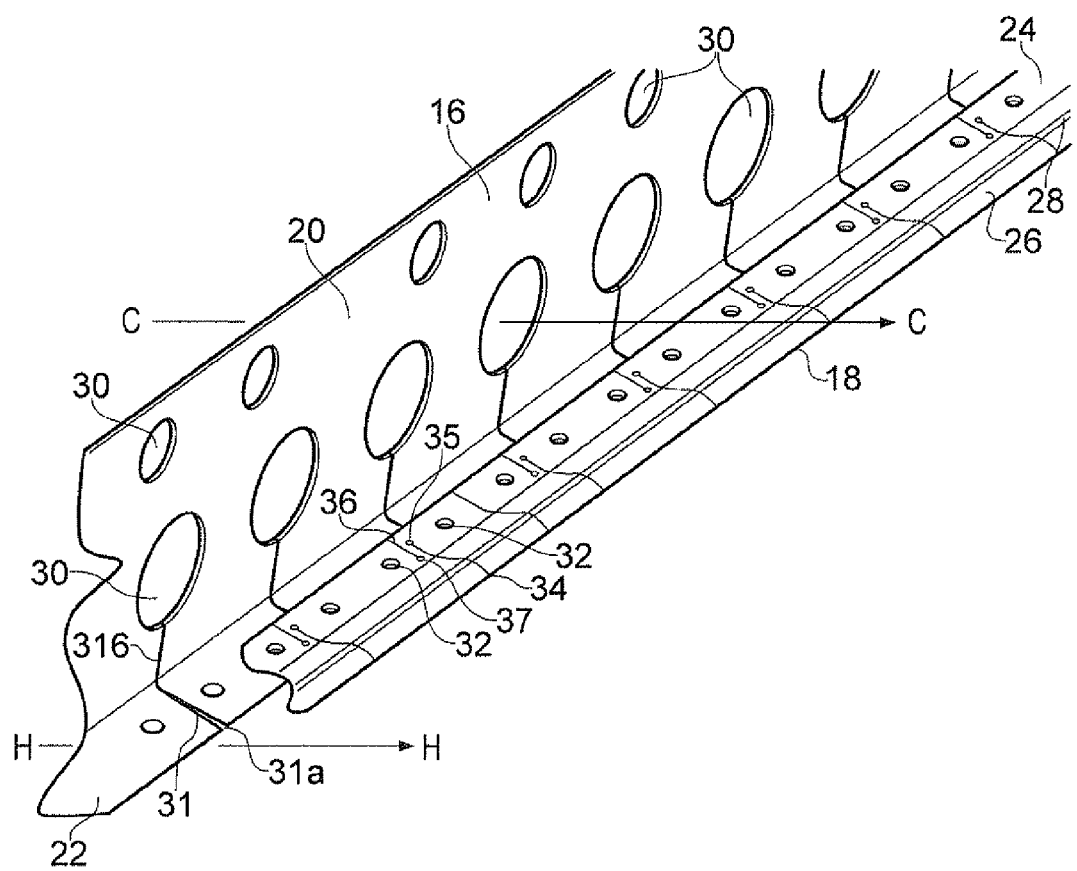
Figure 3B:
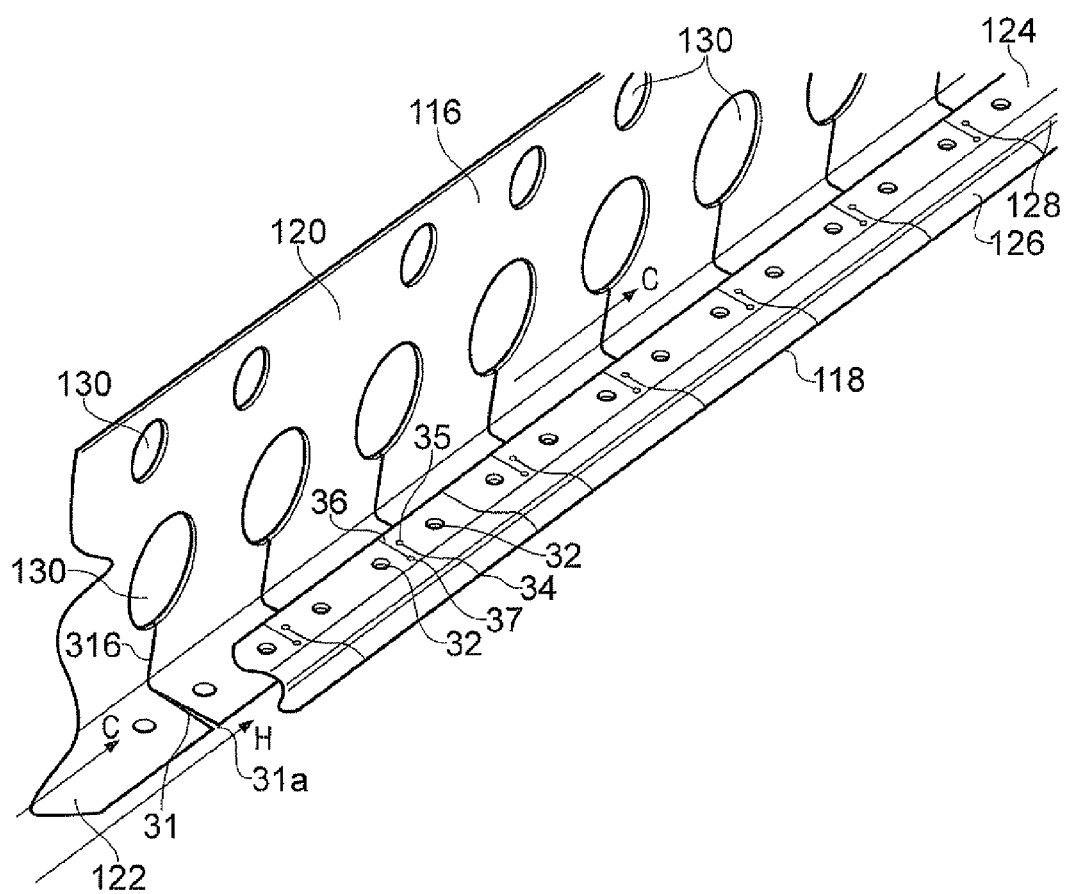
Figure 4:
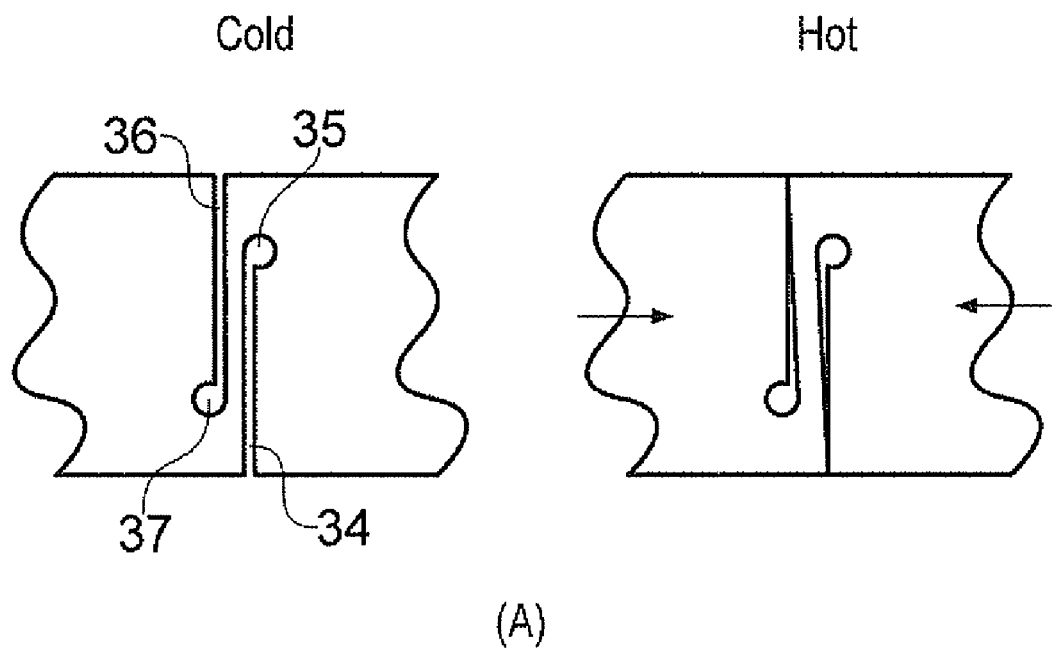
Figure 4:
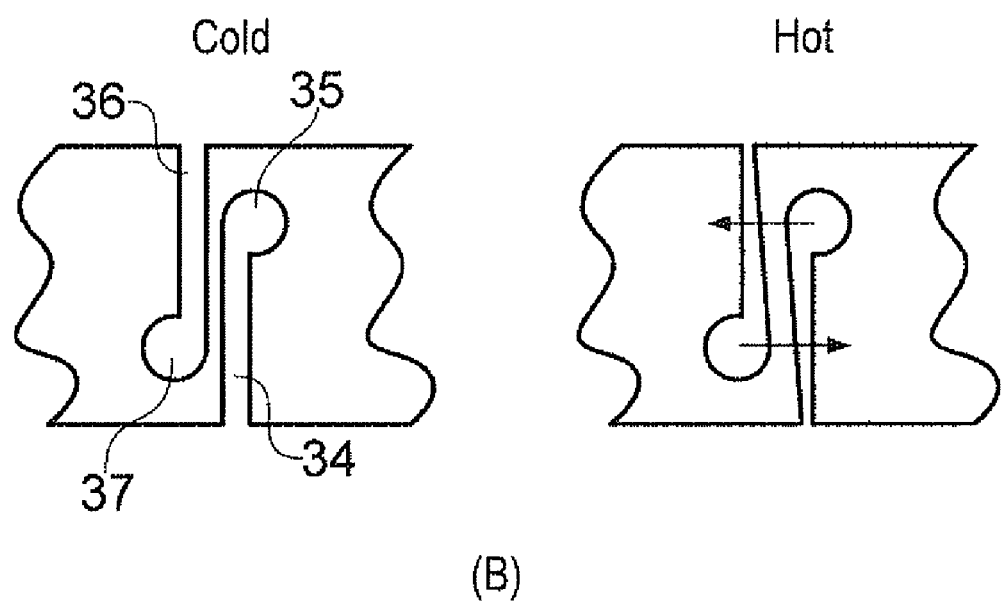

Embodiments of the present invention will now be described, by way of example only, with reference to the accompanying drawings, in which:

FIG. 1A schematically shows a sectional view through a gas turbine engine casing, sealing assembly and liner system;

FIG. 1B schematically shows a sectional view through an alternative gas turbine engine casing, sealing assembly and liner system;

FIG. 2A schematically shows a first sealing assembly sealing against a first liner panel;

FIG. 2B schematically shows a first sealing assembly sealing against a first liner panel of the alternative gas turbine engine casing of FIG. 1B;

FIG. 3A schematically shows an enlarged perspective view of the sealing assembly of FIG. 1A;

FIG. 3B schematically shows an enlarged perspective view of the sealing assembly of FIG. 1B; and FIG. 4A and FIG. 4B schematically show enlarged views of the thermal expansion slots of the seal element of FIGS. 3A and 3B.

FIG. 1A shows a cross-sectional view through the exhaust system of a gas turbine engine 1. The exhaust system includes a substantially annular casing 2 having an annular arrangement of liner panels 3 disposed therein. The arrangement of liner panels comprises a plurality of rings (or annuluses) of liner panels located axially next to one another with a gap between adjacent rings. FIG. 1 only shows first and second axially adjacent liner panels 4, 6 of adjacent rings with a gap 5 between the first and second panels 4, 6. Each ring of liner panels may be a continuous annular liner panel or may comprise a plurality of segments of liner panels circumferentially arranged so as to form an annulus.

An annular cooling air duct 8 is defined between the casing 2 and the annular arrangement of liner panels 3. An exhaust gas duct 10 is defined radially within the annular arrangement of liner panels 3. In use, cooling air flows in direction C within the cooling air duct 8 and hot exhaust gases flow in direction H within the exhaust gas duct 10.

In order to prevent the hot exhaust gases flowing from the exhaust gas duct 10, through the gap 5 between the first and second liner panels 4, 6 and into the cooling air duct 8, two sealing assemblies 12, 14 are provided that together seal the gap 5 between the first and second panels 4, 6. The sealing assemblies 12, 14 also prevent the flow of cooling air into the exhaust gas duct 10. The first sealing assembly 12 seals against the first liner panel 4 and the second sealing assembly 14 seals against the second liner panel 6. The first and second sealing assemblies 12, 14 are substantially identical, although they are mirror images of one another, and together form a composite sealing assembly. Although it has been described that the first and second sealing assemblies 12, 14 are formed separately, as will be readily apparent to one skilled in the art, the first and second sealing assemblies may be integrally formed.

In this embodiment the first and second sealing assemblies 12, 14 are annular and seal a circumferentially extending gap 5 between axially spaced rings of liner panels. References to length are in the circumferential direction and references to width are in the axial direction. Although in this embodiment the seal carrier and seal element extend in the circumferential direction, in other embodiments having Cold and Hot ("C" and "H") flow paths in the same relative direction to the features of the sealing assembly, the seal carrier and seal element may be linear.

In a further embodiment shown in FIG. 1B, the Cold and Hot ("C" and "H") flows are in a different direction relative to the features of the sealing assembly to that shown FIG. 1A. FIG. 1B shows a cross-sectional view looking downstream through the exhaust system of a gas turbine engine 101. The exhaust system includes a non circular casing 102 having a linear arrangement of liner panels 103 disposed therein. The casing may be polygonal in cross-section. The arrangement of liner panels comprises a plurality of linear liner panels located axially next to one another with a gap between adjacent panels. FIG. 1B only shows first and second adjacent liner panels 104, 106 of adjacent panels with a gap 5 between the first and second panels 104, 106.

A cooling air duct 108 is defined between the casing 102 and the liner panels 103. An exhaust gas duct 110 is defined within the liner panels 103. In use, cooling air flows in direction C (i.e. into the plane of the figure) within the cooling air duct 108 and hot exhaust gases flow in direction H within the exhaust gas duct 110 (i.e. into the plane of the figure).

In order to prevent the hot exhaust gases flowing from the exhaust gas duct 110, through the gap 105 between the first and second liner panels 104, 106 and into the cooling air duct 108, two sealing assemblies 112, 114 are provided that together seal the gap 105 between the first and second panels 104, 106. The sealing assemblies 112, 114 also prevent the flow of cooling air into the exhaust gas duct 110. The first sealing assembly 112 seals against the first liner panel 104 and the second sealing assembly 114 seals against the second liner panel 106. The first and second sealing assemblies 112, 114 are substantially identical, although they are mirror images of one another, and together form a composite sealing assembly. Although it has been described that the first and second sealing assemblies 112, 114 are formed separately, as will be readily apparent to one skilled in the art, the first and second sealing assemblies may be integrally formed.

The first sealing assembly 12 as presented in FIG. 1A is shown in FIG. 2A and comprises a seal carrier 16 and a seal element 18. In this embodiment the seal carrier 16 and seal element 18 are manufactured from sheet metal. However, as will be readily apparent to one skilled in the art, other suitable materials may be used. The seal carrier 16 comprises a radially extending portion 20, that is attached to the casing 2 at its radially outer end by a bolt, and an axially extending portion 22 that extends from the radially inner end of the radially extending portion 20. The radially extending portion 20 extends radially inwards from the casing 2 across the cooling air duct 8, through the gap 5 between the first and second liner panels 4, 6 to a position within the exhaust gas duct 10. The axially extending portion 22 of the first sealing assembly 12 is positioned within the exhaust gas duct 10 and axially extends towards the first liner panel 4. The axially extending portion 22 of each sealing assembly forms a seal carrier flange to which the seal element 18 is attached.

The seal element 18 is elongate in the circumferential direction and comprises a seal element flange 24 that overlaps the seal carrier flange 22 and which is attached thereto by a plurality of rivets. The seal element 18 also comprises a flexible seal portion 26 that extends towards the first liner panel 4 and which has a sealing surface 28 on a radial outer surface thereof. The sealing surface 28 is in contact with the radial inner surface of the first liner panel 4 and therefore provides a seal against the first liner panel 4.

An alternative embodiment of the first sealing assembly 112 is shown in FIG. 2B, which corresponds to the arrangement of FIG. 1B. In most respects this embodiment is exactly as that described in relation to FIG. 2A, other than it refers to a linear, rather than annular, arrangement of liner panels 104. The first sealing assembly 112 comprises a seal carrier 116 and a seal element 118. The seal carrier 116 comprises a transverse extending portion 120, that is attached to the casing 102 at its outer end by a bolt, and an laterally extending portion 122 that extends from the free (or "inner") end of the transverse extending portion 120. In this embodiment, the axis of the duct 110 extends into the plane of the figure. The transverse extending portion 120 extends inwards from the casing 112 across the cooling air duct 108, through the gap 105 between the first and second liner panels 114, 116 to a position within the exhaust gas duct 110. The laterally extending portion 122 of the first sealing assembly 12 is positioned within the exhaust gas duct 110 and extends towards the first liner panel 14. The laterally extending portion 122 of each sealing assembly forms a seal carrier flange to which the seal element 118 is attached.

The seal element 118 is elongate in the lateral direction and comprises a seal element flange 124 that overlaps the seal carrier flange 122 and which is attached thereto by a plurality of rivets. The seal element 118 also comprises a flexible seal portion 126 that extends towards the first liner panel 104 and which has a sealing surface 128 on an outer surface thereof. The sealing surface 128 is in contact with the inner surface of the first liner panel 104 and therefore provides a seal against the first liner panel 104.

As shown in FIG. 1A and FIG. 1B, the second sealing assembly 14, 114 is a mirror image of the first sealing assembly 12, 112 and is located next to the first sealing assembly 12, 112. The seal carriers 16, 116 of the first and second sealing assemblies 12, 112, 14, 114 are attached to the casing 2, 102 at substantially the same position. The radially/transversely extending portion 20, 120 of the second sealing assembly 14, 114 is adjacent to the radially/transversely extending portion 20, 120 of the first sealing assembly and extends radially/transversely inwardly to a position within the exhaust gas duct 10, 110. The axially/laterally extending portion 22, 122 of the second sealing assembly 14, 114 is positioned within the exhaust gas duct 10, 110 and extends towards the second liner panel 6, 106. The sealing surface 28, 128 of the second sealing assembly 14, 114 seals against the second liner panel 6, 106 and therefore the composite sealing assembly comprising the first and second sealing assemblies 12, 112, 14, 114 provides a seal between the first and second adjacent liner panels 4, 104, 6, 106 and prevents (or at least restricts) flow between the exhaust gas duct 10, 110 and the cooling air duct 8, 108.

Although it has been described that the first and second sealing assemblies 12, 112, 14, 114 are separate and each have a respective seal carrier 16, 116, it is possible that the first and second sealing assemblies 12, 112, 14, 114 are integrally formed and therefore have a common seal carrier. In other words, the seal carrier 16, 116 of the first sealing assembly 12, 112 may be the same as the seal carrier 16, 116 of the second sealing assembly.

FIG. 3A shows an enlarged view of the first sealing assembly 12, although it should be noted that the second sealing assembly 14 is substantially identical to the first sealing assembly 12. In this embodiment the seal carrier 16 and seal element 18 are shown as linear. As previously described with reference to FIG. 1A and FIG. 2A the seal carrier 16 and seal element 18 may be curved to define an annular flow path arrangement. The transversely/radially extending portion 20 of the seal carrier 16 is provided with a plurality of apertures (or through-holes) 30. In use, this allows cooling air to flow within the cooling air duct 8 in direction C past the radially extending portions 20 of the first and second sealing assemblies 12, 14, by flowing through the apertures 30. In this embodiment the air flow directions C,H are across the sealing assembly, i.e. from left to right in FIG. 3A. The seal element flange 24 is attached to the laterally/axially extending portion 22 (or seal carrier flange) of the seal carrier 16 by rivets that are provided at a plurality of discrete positions 32.

FIG. 3B shows an enlarged view of the first sealing assembly 112 as shown in FIGS. 1B and 2B, although it should be noted that the second sealing assembly 114 is substantially identical to the first sealing assembly 112. In this embodiment the air flow directions C,H are along the sealing assembly, i.e. parallel to the plane of the transversely extending portion 120 and along the length of the laterally extending portion 122. The transversely extending portion 120 of the seal carrier 116 is provided with a plurality of apertures (or through-holes) 130. In use, this allows cooling air to flow across the transversely extending portions 120 of the first and second sealing assemblies 112, 114, by flowing through the apertures 130. However, the bulk of the air flow is in the direction indicated by arrows C,H along the sealing assembly. The seal element flange 124 is attached to the transversely extending portion 122 (or seal carrier flange) of the seal carrier 116 by rivets that are provided at a plurality of discrete positions 132.

With reference to both FIG. 3A and FIG. 3B, The seal carrier 16, 116 is also provided with a plurality of seal carrier thermal expansion slots 31 which are spaced along the length of the seal carrier 16, 116 and extend in the width direction of the seal carrier 16, 116. A seal carrier thermal expansion slot 31 is disposed between the discrete positions at which the seal element 18, 118 is attached (by riveting) to the seal carrier 16, 116. Each seal carrier thermal expansion slot 31 is continuous and has a first portion 31a that is provided in the axially/laterally extending portion 22, 122 and a second portion 31b that is provided in the radially/transversely extending portion 20, 120. The first portion 31a extends though the axially/laterally extending portion 22, 122 of the seal carrier 16, 116 and the second portion partially extends through the radially extending portion 20, 120 of the seal carrier 16, 116 and opens into an aperture 30, 130. In other words, the seal carrier thermal expansion slot 31 extends from the free edge of the axially/laterally extending portion 22, 122 and opens into an aperture 30, 130 provided in the radially/transversely extending portion 20, 120.

The seal element 18, 118 is provided with a plurality of thermal expansion regions, each thermal expansion region being located between adjacent discrete positions at which the seal element 18, 118 is attached to the seal carrier 16, 116. Each thermal expansion region comprises first and second thermal expansion slots 34, 36 that are adjacent to one another. The first thermal expansion slot 34 extends from a first edge of the seal element 18, 118 over a portion of the width of the seal element 16, 116. The second thermal expansion slot 36 extends from a second opposite edge of the seal element 18, 118 over a portion of the width of the seal element 18, 118. The first and second thermal expansion slots 34, 36 are located side-by-side in the length direction of the seal element 18, 118 and overlap in the width direction of the seal element 18, 118. The first and second seal elements 34, 36 overlap in the region where the seal element flange 24, 124 overlaps the seal carrier flange 22, 122. In this embodiment the first and second seal thermal expansion slots 34, 36 extend in the width direction of the seal element 18. The end of each thermal expansion slot 34, 36 is provided with an enlarged portion 35, 37.

In these embodiments the seal element 18, 118 is attached to the seal carrier 16, 116 at a large number of discrete positions that are spaced along the length of the seal element 18, 118. It may be attached at a number of positions greater than 5 or 10, for example. In some embodiments it may be attached at a number of positions greater than 20, or 30, for example. The seal element 18, 118 may have a thermal expansion region comprising at least one thermal expansion slot 34, 36 located between pairs of adjacent discrete positions of attachment. A thermal expansion region may be located between every pair of adjacent discrete positions of attachment. There may be greater than 5, 10, 20, 30 or 40 thermal expansion regions.

In use, the radially/transversely extending portion 20, 120 of the seal carrier 16, 116 is exposed to the cooling air flow C within the cooling air duct 8, 108, whilst the axially/laterally extending portion 22, 122 of the seal carrier 18, 118 is exposed to the hot exhaust gas flow within the exhaust gas duct 10, 110. An outer surface of the seal element 18, 118 is exposed to the cooling air flowing within the cooling air duct 8, 108 and an inner surface of the seal element 18, 118 is exposed to the hot exhaust gas flow within the exhaust gas duct 10, 110. This means that the radially/transversely extending portion 20, 120, the axially extending portion 22, 122, and the seal element 18, 118 thermally expand at different rates.

The axially/laterally extending portion 22, 122 thermally expands in the length direction by a greater amount than the radially/transversely extending portion 20, 120 due to the difference in temperature that the two portions are exposed to. The seal carrier thermal expansion slots 31 accommodate for this difference in thermal expansion which mainly occurs in the area underneath the seal element 18, 118. The hot side of the seal element 18, 118 (the side exposed to the exhaust gas duct 10, 110) is held at a similar length to the length of the cold side of the seal element 18, 118 (the side exposed to the cooling air duct 8, 108). This is necessary in order to maintain acceptable stresses because the (cold) radially/transversely extending portion 20, 120 of the seal carrier 16, 116 cannot thermally expand in the length direction as it is fixedly attached to the casing 2, 102 by bolts.

The thermal expansion regions provided in the seal element 18, 118 allows the seal element 18, 118 and axially/laterally extending portion 22, 122 of the seal carrier 16, 116 to thermally expand at different rates in the length direction of the seal element 18, 118. With reference to FIGS. 4A and B, in the cold condition the first and second thermal expansion slots 34, 36 are of substantially constant width. When the engine is running and hot exhaust gas flows through the exhaust gas duct 10, 110 the first and second thermal expansion slots 34, 36 deform in order to accommodate for a difference in thermal expansion between the seal carrier 16, 116 and the seal element 18, 118. The deformation of the thermal expansion slots 34, 36 absorbs the difference in the change in length between the seal element 18, 118 and the seal carrier 16, 116 in the region between the positions at which the seal element 18, 118 is riveted to the seal carrier 16, 116. The enlarged portions 35, 37 of the first and second thermal expansion slots 34, 36 allow the thermal expansion slots 34, 36 to deform easily. The thermal expansion regions allow the seal element flange 24, 124 to slide over the seal carrier flange 22, 122 in the region in between the rivets (or discrete positions of attachment). This prevents undesirably high induced stresses being generated due to different thermal expansions. If the thermal expansion slots 34, 36 were not present then the seal element 18, 118 would experience stresses which could cause the seal element flange 24 to buckle and lift away from the seal carrier flange 22, 122 in between the rivets, thereby compromising the integrity of the seal.

Since the first and second thermal expansion slots 34, 36 extend from opposite sides of the seal element 18, 118 and only extend over a portion of the width of the seal element 18, 118, the seal element 18, 118 can be made as a continuous piece which makes the seal assembly relatively inexpensive to manufacture and relatively easy to install.

Although it has been described that the sealing assembly is for sealing between an annular casing and an annular arrangement of liner panels in a gas turbine engine, and for sealing between a polygonal casing and a linear arrangement of liner panels in a gas turbine engine, the sealing assembly may be used to provide a seal in other applications. The seal assembly is particularly suitable for providing a seal where there is a temperature gradient across the seal, or where the seal carrier and seal element are manufactured from different components and therefore experience different rates of thermal expansion.

The invention claimed is:

1. A sealing assembly for providing a seal against a component, comprising:
   a seal carrier; and
   a continuous seal element attached to the seal carrier at at least two discrete positions of attachment, the seal element having a sealing surface that is arranged to seal against the component; wherein:
   the seal carrier is provided with a seal carrier thermal expansion slot that is located between the discrete positions of attachment, and
   the seal element is provided with a first thermal expansion slot that is located between the discrete positions of attachment and which extends from a first edge of the seal element over a portion of the width of the seal element so as to allow the seal carrier and seal element to thermally expand in the length direction at different rates.

2. A sealing assembly according to claim 1, wherein the seal element is further provided with a second thermal expansion slot which is located adjacent to the first thermal expansion slot and which extends from a second edge of the seal element over a portion of the width of the seal element.

3. A sealing assembly according to claim 2, wherein the first and second thermal expansion slots are spaced from one another and overlap in the width direction of the seal element.

4. A sealing assembly according to claim 1, wherein the first and/or second thermal expansion slots extend in substantially the width direction of the seal element.

5. A sealing assembly according to claim 1, wherein the end of the first and/or second thermal expansion slot located away from the edge of the seal element has an enlarged width.

6. A sealing assembly according to claim 1, wherein the seal carrier comprises a seal carrier flange and the seal element comprises a seal element flange, wherein the seal element flange is attached to the seal carrier flange such that they overlap.

7. A sealing assembly according to claim 1, wherein:
   the seal carrier comprises a seal carrier flange and the seal element comprises a seal element flange,
   the seal element flange is attached to the seal carrier flange such that they overlap, and
   the seal carrier thermal expansion slot is provided in the seal carrier flange.

8. A sealing assembly according to claim 1, wherein the seal carrier thermal expansion slot extends in substantially the width direction of the seal carrier.

9. A sealing assembly according to claim 1, wherein the seal element is attached to the seal carrier by rivets.

10. A gas turbine engine comprising:
    a casing;
    a liner panel disposed within the casing, wherein a cold flow region is defined between the casing and the liner panel and a hot flow region is defined inside the liner panel; and
    a sealing assembly in accordance with claim 1, wherein the seal carrier is attached to the casing and extends across the cold flow region, and wherein the sealing surface of the seal element seals against the liner panel.

11. A sealing assembly according to claim 1, the sealing assembly providing a seal between first and second components, the sealing assembly comprising:
   a first sealing assembly comprising the sealing assembly, wherein the sealing surface of the seal element is arranged to seal against the first component; and
   a second sealing assembly comprising the sealing assembly, wherein the sealing surface of the seal element is arranged to seal against the second component.

12. A sealing assembly according to claim 11, wherein the seal carriers of the first and second sealing assemblies are integrally formed or attached to one another.

13. A gas turbine engine comprising:
   a casing;
   first and second liner panels disposed within the casing and spaced from one another, wherein a cold flow region is defined between the casing and the liner panels and a hot flow region is defined inside the liner panels; and
   a sealing assembly in accordance with claim 11, wherein the seal carriers of the first and second sealing assemblies are attached to the casing and extend across the cold flow region, and wherein the sealing surface of the first sealing assembly seals against the first liner panel and the sealing surface of the second sealing assembly seals against the second liner panel, thereby restricting the flow between the cold flow region and the hot flow region.

14. A gas turbine engine comprising a sealing assembly in accordance with claim 11.

15. A gas turbine engine comprising a sealing assembly in accordance with claim 1.

* * * * *